United States Patent [19]

Ito

[11] Patent Number: 4,672,285
[45] Date of Patent: Jun. 9, 1987

[54] INVERTER CONTROL CIRCUIT
[75] Inventor: Tomotaka Ito, Aichi, Japan
[73] Assignee: Mitsubishi Denki Kabushiki Kaisha, Tokyo, Japan
[21] Appl. No.: 824,252
[22] Filed: Jan. 30, 1986
[30] Foreign Application Priority Data
Jan. 31, 1985 [JP] Japan .................................. 60-17262
Nov. 29, 1985 [JP] Japan ............................... 60-267434
[51] Int. Cl.⁴ ............................................. H02P 3/18
[52] U.S. Cl. .................................. 318/757; 318/811; 363/41
[58] Field of Search .................. 363/41; 318/757, 811; 364/492

[56] References Cited
U.S. PATENT DOCUMENTS 3,983,463 9/1976 Nabae et al. ........................ 318/803
4,447,786 5/1984 Saar et al. ............................ 318/811
4,595,976 6/1986 Parro ..................................... 363/41

FOREIGN PATENT DOCUMENTS 202875 12/1982 Japan ..................................... 363/41
117476 7/1984 Japan ................................... 318/757

Primary Examiner—William H. Beha, Jr.
Attorney, Agent, or Firm—Bernard, Rothwell & Brown

[57] ABSTRACT

An inverter control circuit adapted, in the process to slow down and stop an induction motor, such that supply of the clock for combining voltage patterns is cut off by a control signal from its central processing unit and simultaneously voltage patterns dedicated for stopping which are stored in its storage device in addition to fundamental voltage patterns may be selected, whereby a stationary magnetic field is formed for the induction motor and optimum braking action corresponding to the condition of the load is provided.

1 Claim, 6 Drawing Figures

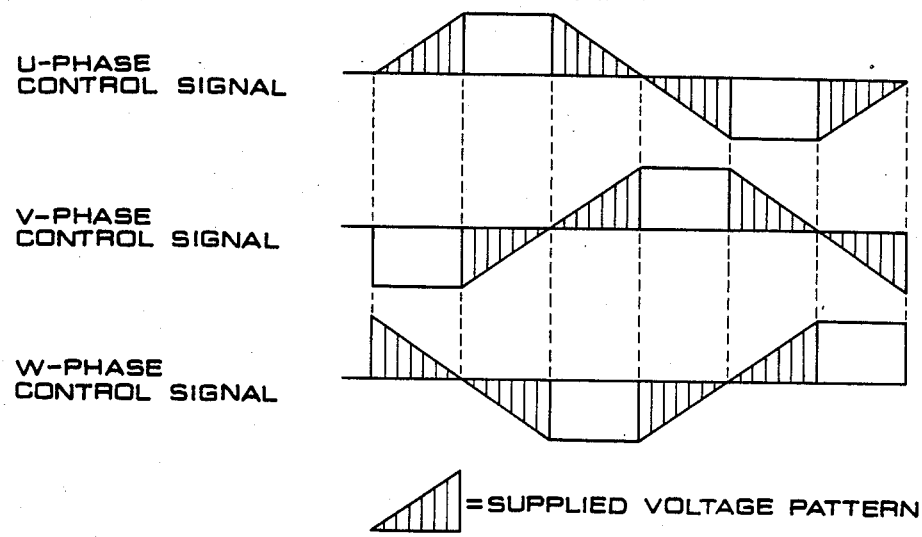

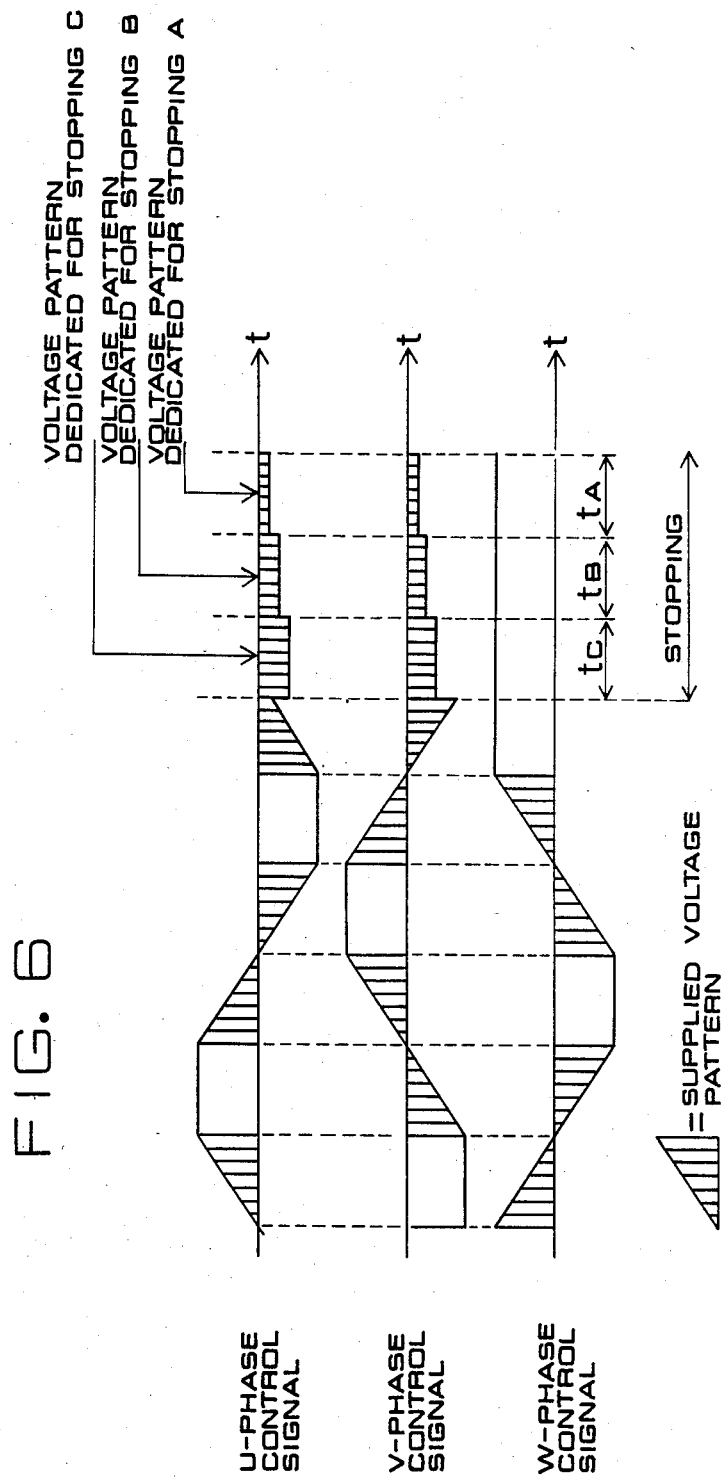

INVERTER CONTROL CIRCUIT

BACKGROUND OF THE INVENTION

1. Field of the Invention

The present invention relates to an inverter control circuit and more particularly to an inverter control circuit which employs a ROM (Read Only Memory) or the like, unused storage regions thereof being utilized for storing voltage patterns dedicated for stopping an induction motor thereby for controlling number of revolutions of the induction motor.

2. Description of the Prior Art

As an inverter control circuit of the described type, there has been proposed a circuit as shown in FIG. 1. Referring to FIG. 1, reference numeral 1 denotes a voltage command generator outputting a six-bit signal, 2 denotes a frequency command generator outputting a six-bit signal, both thereof in general being functionally included in a microcomputer 6, 3 denotes a storage device, hereafter to be called a ROM, having 4096 8-bit words of storage capacity, 4 denotes a data selector, and 5 denotes a ring counter. In providing three-phase a.c. control signals, the circuit of FIG. 1 is adapted such that switching devices for two phases in the main circuit for the inverter apparatus may do switching operations in accordance with the voltage patterns stored in the ROM 3 while the remaining one phase may be either in conducting or nonconducting state. Further, combinations of conducting states of these three phases are adapted to be alternated at intervals of 60° of electrical angles by means of the ring counter 5, whereby the three-phase a.c. control signals (U-phase, V-phase, and W-phase) are provided with the phase voltage patterns as shown in FIG. 3.

FIG. 2 indicates the manner of storing the voltage pattern data into the ROM 3 shown in FIG. 1. Since the voltage command is given in six bits, there are obtainable 64 ways at the maximum of the voltage patterns, and therefore, by making the range of the output frequencies of the inverter from 3 Hz to 60 Hz, it is possible to make the voltage patterns stored in increments of 1 Hz as shown in FIG. 2.

When an induction motor is slowed down and stopped by the inverter circuit as referred to in the foregoing controlled by the described circuit, the induction motor will be decelerated to the number of revolutions corresponding to 3 Hz and then allowed to stop after freely running for a while. Therefore, there was a defect that control precision for stopping was worsened especially in such a case that a load of larger inertia was connected to the induction motor.

SUMMARY OF THE INVENTION

A primary object of the invention is the provision of an effective inverter control circuit in which the above described defect of the prior art device is overcome.

Another object of the invention is the provision of an inverter control circuit which provides an optimum braking performance corresponding to the connected load even if it is of large inertia.

Other objects and advantages of the invention will be made more apparent from the following detailed description of the preferred embodiment taken in conjunction with the accompanying drawings.

BRIEF DESCRIPTION OF THE DRAWINGS

FIG. 3 is a waveform chart showing phase voltage control signals in the prior art;

FIG. 4 is an explanatory drawing showing contents of stored data in the storage device of an inverter control circuit of the invention;

FIG. 6 is a waveform chart showing phase voltage control signals of the invention.

DESCRIPTION OF THE PREFERRED EMBODIMENT

A preferred embodiment of the present invention will be described below.

Figure 1:
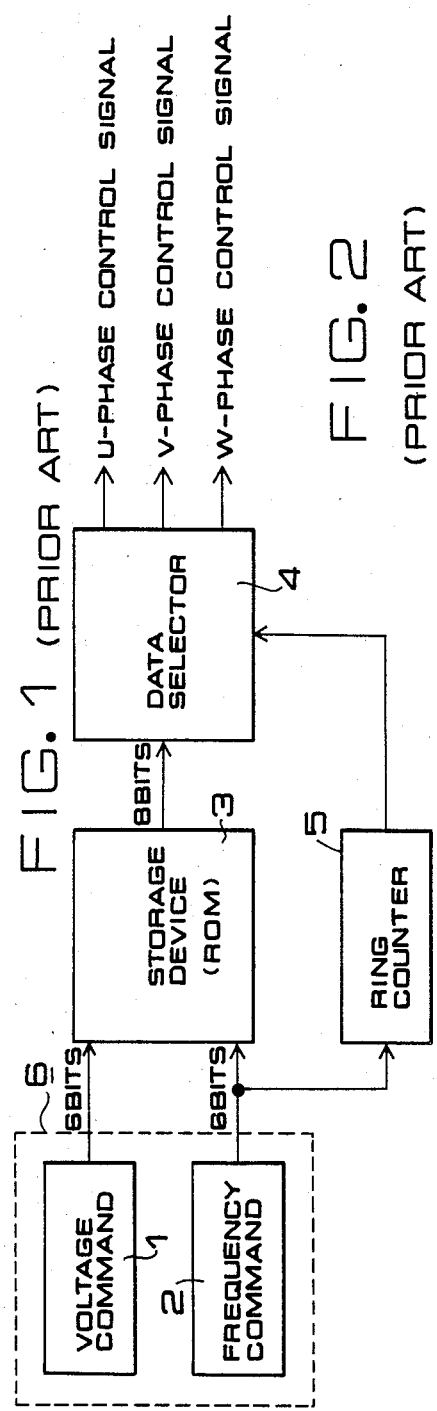
FIG. 1 is a block diagram indicating a prior art inverter control circuit.
Figure 2:
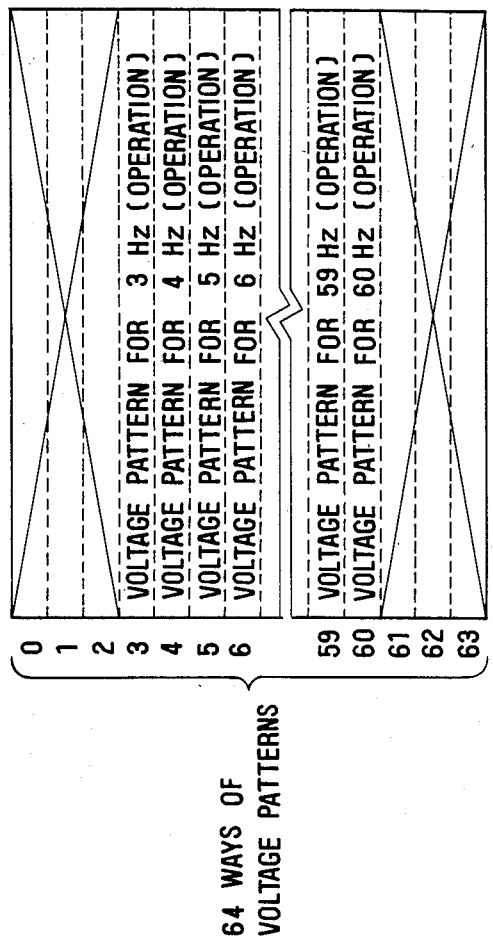
FIG. 2 is an explanatory drawing showing contents of stored data in the storage device in FIG. 1.
Figure 5:
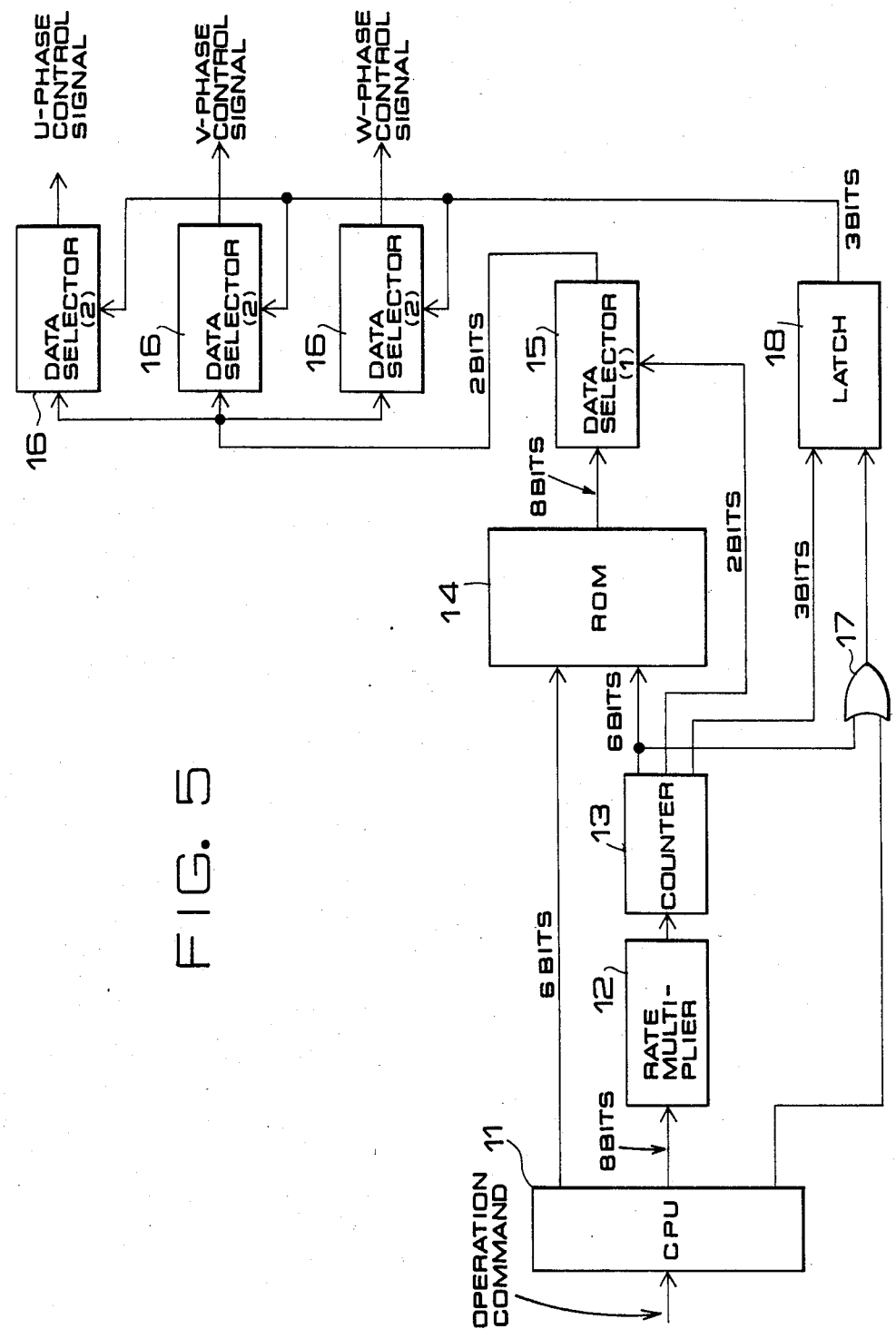
FIG. 5 is a block diagram indicating an inverter control circuit of one embodiment of the invention.

FIG. 4 shows contents of data stored in the ROM 3 as the storage device in FIG. 1 in which three kinds of voltage patterns (C), (B), and (A) dedicated for stopping an induction motor are included, being stored in an unused region. FIG. 5 shows a concrete circuit structure of the invention. Reference numeral 11 denotes a CPU formed of an eight-bit one-chip micro computer, 12 denotes a rate multiplier, 13 denotes a 12-stage binary counter, 14 denotes a storage device (ROM) of 8 K bytes of storage capacity, 15 denotes a four-bit two-channel data selector, 16 denotes eight-bit one-channel data selector. 17 denotes a gate IC, and 18 denotes a latch circuit formed of a multi-input D type flip-flop.

Operations of the above circuit will now be described. Responding to an operation command of an induction motor, the CPU 11 outputs a six-bit binary signal as a voltage command to the ROM 14 and, at the same time, outputs an eight-bit binary signal as a frequency command to the rate multiplier 12. The rate multiplier 12 outputs a frequency signal proportional to the eight-bit binary signal thereby making parallel-to-serial conversion of the frequency command. The binary counter 13, taking the serial frequency signal as the clock, accesses the address of the ROM 14 with its six-bit count signal. The ROM 14, affordable 64 ways at the maximum of voltage patterns since the voltage command is given thereto in six bits, can be arranged to store therein voltage patterns in increments of 1 Hz as shown in FIG. 4 if the output frequency range of the inverter is set to be from 3 Hz to 60 Hz. The voltage pattern selected by the voltage command is accessed by the six-bit access signal from the binary counter 13 and outputted in eight bits. Since the voltage pattern has been stored after being divided into divisions at suitable electrical angles for improvement of the utilization efficiency of the storage capacity of the ROM 14, the voltage pattern output in eight bits is first combined by the data selector 15 operating with a frequency signal frequency-divided by the binary counter 13 taken as the clock and then formed into a three-phase a.c. control signal by the data selectors 16 with a frequency signal frequency-divided by the binary counter 13 taken as the clock.

Points characteristic to the present circuit are that, as described above, the ROM 14 is provided with three kinds of voltage patterns dedicated for stopping an induction motor stored into its unused region and that the latch circuit 18 formed of a D type flip-flop is disposed between the binary counter 13 and the address input to the data selectors 16 with a control signal from the CPU 11 and an output signal from the binary counter 13 taken as the clock signal. It is matter of course that the frequency of the output signal of the binary counter 13 taken as the clock is higher than the three-bit output signal from the binary counter 13 input to the latch circuit 18.

Now, description will be made going along the sequence of modes for first accelerating the induction motor from 3 Hz to 60 Hz and then decelerating the motor until the same is stopped. Upon issuance of a command for accelerating the induction motor, the voltage command for selecting the voltage pattern at the frequency of 3 Hz is a first output from the CPU 11 and the voltage patterns for higher frequencies are then selected in increments of 1 Hz until that for 60 Hz is selected. Then, if a deceleration command enters into the circuit, the voltage commands are successively changed from that for 60 Hz to that for 3 Hz. Following the selection of the voltage pattern for 3 Hz, the pulse widths of the voltage patterns for stopping (C), (B), and (A) are made gradually narrower as shown in FIG. 6 and the respective outputting periods of time are made into $t_C$, $t_B$, and $t_A$, and further, since the clock for the latch circuit 18 is stopped by a control signal from the CPU 11, the 3-bit address signal for the data selectors 16 output from the binary counter 13 is latched thereby, so that the three-phase a.c. control signal is fixed at a certain phase. Therefore, a stationary magnetic field is formed in the induction motor by the voltage patterns for stopping (C), (B), and (A) and the motor is thus stopped.

The mentioned status is represented by phase voltage patterns of the control signal for respective phases as shown in FIG. 6. That is, although the pulse widths for the voltage patterns between 3 Hz and 60 Hz are varied with time so that the induction motor may rotate smoothly, the pulse widths in the voltage patterns dedicated for stopping are made constant and made narrower in order of (C), (B) and (A). And by combination of the voltage patterns dedicated for stopping (C), (B), and (A) and respective outputting periods of time $t_C$, $t_B$, and $t_A$, optimum stop control in accordance with the load condition can be achieved.

According to the present invention, as described so far, the inverter control circuit is adapted such that the storage device with the voltage patterns stored therein is further provided with several kinds of voltage patterns dedicated for stopping the motor stored therein in the unused region and the latch circuit controlling the data selectors which form the three-phase a.c. control signal by selecting and combining the voltage patterns will be cut off from supply of the clock signal, and therefore, a stationary magnetic field is formed for the induction motor. Thus, such an effect is produced that the circuit can perform an optimum braking function corresponding to the condition of the load.

What is claimed is:
1. An inverter control circuit comprising:
    (a) a central processing unit supplied with an operating command for an induction motor;
    (b) a storage device supplied with a voltage command signal from said central processing unit and stored therein with voltage patterns forming the basis of three-phase a.c. control signals and further stored therein in a different region from that for said patterns with voltage patterns dedicated for stopping to be used for stopping the induction motor;
    (c) a rate multiplier supplied with a frequency command signal from said central processing unit for outputting a frequency signal proportional to the frequency command signal;
    (d) a counter supplied with a frequency signal from said rate multiplier as the clock therefor for accessing an address of said storage device with its count signal;
    (e) a first data selector supplied with a frequency signal frequency-divided by said counter as the clock therefor for combining voltage patterns selected from said storage device by the voltage command signal;
    (f) second data selectors supplied with a frequency signal frequency-divided by said counter as the clock therefor for forming a three-phase a.c. control signal; and
    (g) a latch circuit disposed between said counter and address input to said second data selectors and supplied with a control signal from said central processing unit and an output signal from said counter as the clock therefor.

* * * * *